(12) United States Patent
Besecker et al.

(10) Patent No.: US 7,125,528 B2
(45) Date of Patent: Oct. 24, 2006

(54) MEMBRANE SYSTEMS CONTAINING AN OXYGEN TRANSPORT MEMBRANE AND CATALYST

(75) Inventors: Charles J. Besecker, Batavia, IL (US); Terry J. Mazanec, Solon, OH (US); Sherman J. Xu, Naperville, IL (US); Erling Rytter, Trondheim (NO)

(73) Assignee: BP Corporation North America Inc., Warrenville, IL (US)

( * ) Notice: Subject to any disclaimer, the term of this patent is extended or adjusted under 35 U.S.C. 154(b) by 614 days.

(21) Appl. No.: 10/154,704

(22) Filed: May 24, 2002

(65) Prior Publication Data

US 2003/0218991 A1    Nov. 27, 2003

(51) Int. Cl.
  *B01J 8/02*   (2006.01)
  *B01J 8/04*   (2006.01)
  *B01D 53/22*  (2006.01)
  *B01D 59/12*  (2006.01)

(52) U.S. Cl. .................... 422/211; 422/217; 422/222; 422/240; 95/54

(58) Field of Classification Search ............... 422/211, 422/217, 222, 240; 95/54
See application file for complete search history.

(56) References Cited

U.S. PATENT DOCUMENTS

| | | | |
|---|---|---|---|
| 4,665,042 A | 5/1987 | Budge et al. | |
| 4,791,079 A | 12/1988 | Hazbun | |
| 4,810,685 A | 3/1989 | Twigg et al. | |
| 4,827,071 A | 5/1989 | Hazbun | |
| 5,198,099 A * | 3/1993 | Trachte et al. ................ | 208/89 |
| 5,240,480 A | 8/1993 | Thorogood et al. | |
| 5,306,411 A | 4/1994 | Mazanec et al. | |
| 5,554,286 A * | 9/1996 | Okamoto et al. ...... | 210/500.25 |
| 5,569,633 A | 10/1996 | Carolan et al. | |
| 5,573,737 A | 11/1996 | Balachandran et al. | |
| 5,658,497 A | 8/1997 | Kumar et al. | |
| 5,702,959 A | 12/1997 | Hutter et al. | |
| 5,702,999 A | 12/1997 | Mazanec et al. | |
| 5,712,220 A | 1/1998 | Carolan et al. | |
| 5,714,091 A | 2/1998 | Mazanec et al. | |
| 5,723,035 A | 3/1998 | Mazanec et al. | |

(Continued)

FOREIGN PATENT DOCUMENTS

DE    19907796 A1    2/2000

(Continued)

OTHER PUBLICATIONS

R. Bredesen, "Catalytic Membrane Reactors," The Forum Seminar on Catalytic Membrane Reactors, Lysaker (Dec. 8, 1997).

(Continued)

*Primary Examiner*—Alexa D. Neckel
(74) *Attorney, Agent, or Firm*—John I. Wood; Thomas A. Yassen (57) ABSTRACT

An apparatus for separating oxygen from an oxygen-containing gas and facilitating a chemical reaction with the separated oxygen includes a mixed conducting membrane, a porous body, and a material for catalyzing the reaction. The mixed conducting membrane has respective oxidation and reduction surfaces and is made of a non-porous, gas-impermeable, solid material capable of simultaneously conducting oxygen ions and electrons. At least the membrane and the catalyzing material are non-reactive with each other or are physically separated from each other during oxygen separation and the chemical reaction. The apparatus can be embodied by tubes, and a plurality of such tubes can form part of a reaction vessel in which various chemical reactions can occur benefiting from the apparatus design.

22 Claims, 5 Drawing Sheets

U.S. PATENT DOCUMENTS

| | | |
|---|---|---|
| 5,733,435 A | 3/1998 | Prasad et al. |
| 5,837,034 A | 11/1998 | Keskar et al. |
| 5,846,641 A | 12/1998 | Abeles et al. |
| 5,865,878 A | 2/1999 | Drnevich et al. |
| 5,980,840 A | 11/1999 | Kleefisch et al. |
| 5,980,843 A | 11/1999 | Silversand |
| 6,010,614 A | 1/2000 | Keskar et al. |
| 6,077,323 A | 6/2000 | Nataraj et al. |
| 6,106,591 A | 8/2000 | Keskar et al. |
| 6,139,810 A | 10/2000 | Gottzmann et al. |
| 6,146,549 A | 11/2000 | Mackay et al. |
| 6,214,066 B1 | 4/2001 | Nataraj et al. |
| 6,214,757 B1 | 4/2001 | Schwartz et al. |
| 6,264,811 B1 | 7/2001 | Wang et al. |
| 6,287,432 B1 | 9/2001 | Mazanec et al. |
| 2002/0022568 A1 | 2/2002 | Mackay et al. |

FOREIGN PATENT DOCUMENTS

| | | |
|---|---|---|
| EP | 0 732 138 B1 | 9/1996 |
| EP | 1095914 A2 * | 5/2001 |
| WO | WO 99/21649 | 5/1999 |
| WO | WO 01/70626 A1 | 9/2001 |
| WO | WO 01/70626 A9 | 5/2002 |
| WO | WO 03/033431 A1 | 4/2003 |

OTHER PUBLICATIONS

V. Ettel, "New Inco Powders and Foams for Nickel Batteries," Paper Presented at NiCad 98 Seminar in Prague, Czech Republic (Sep. 21-22, 1998).

Mazanec, *Electrochem. Soc. Proceedings* 95: 16-28 (1997).

* cited by examiner

MEMBRANE SYSTEMS CONTAINING AN OXYGEN TRANSPORT MEMBRANE AND CATALYST

BACKGROUND OF THE DISCLOSURE

1. Field of the Disclosure

The disclosure relates generally to the design and use of catalytic membrane reactors. More specifically, the disclosure relates to reactors containing one or more oxygen transport membranes and a catalyst, and methods of using the same for carrying out more efficient chemical reactions.

2. Brief Description of Related Technology

Catalytic membrane reactors using solid state membranes for oxidation and/or decomposition of various chemical compositions have been studied and used. One potentially valuable use of such reactors is in the production of synthesis gas. Synthesis gas is a mixture of carbon monoxide (CO) and molecular hydrogen ($H_2$), and is used as a feedstock in the production of bulk chemicals such as, for example, methanol, acetic acid, ammonia, oxo-products, hydrogen, hydroquinone, ethanol, ethylene, paraffins, aromatics, olefins, ethylene glycol, Fischer-Tropsch products, substitute natural gas, and other liquid fuels, such as gasoline.

Synthesis gas typically is produced from natural gas (i.e., gas containing methane ($CH_4$)) or other light hydrocarbons by steam reforming or partial oxidation. In steam reforming, natural gas is mixed with steam and heated to high temperatures. Thereafter the heated mixture is passed over a catalyst, such as nickel (Ni) on aluminum oxide ($Al_2O_3$), to form synthesis gas:

$$CH_4 + H_2O \rightarrow 3H_2 + CO$$

Synthesis gas is obtained in a partial oxidation reaction when natural gas is reacted with molecular oxygen ($O_2$) in an exothermic reaction (i.e., the reaction evolves energy):

$$CH_4 + \tfrac{1}{2}O_2 \rightarrow 2H_2 + CO$$

Both the steam-reforming reaction and the partial oxidation reaction are expensive to maintain. Conventional steam-reforming techniques present significant obstacles. First, the chemical reaction to produce the synthesis gas from natural gas and steam ($H_2O$) is endothermic (i.e., the reaction requires energy). Roughly one third of the natural gas consumed in the steam-reforming process is required to produce the heat necessary to drive the endothermic reaction, rather than to produce the synthesis gas. Second, the ratio of $H_2$:CO in the synthesis gas produced by steam reforming is relatively high (e.g., about 3:1 to about 5:1). For most efficient use in the synthesis of methanol, for example, the ratio of $H_2$:CO in synthesis gas should be about 2:1. Adjusting this ratio, however, adds to the cost and complexity of the process. In the partial oxidation reaction, significant energy and capital are required to provide the molecular oxygen necessary to drive the reaction. The oxygen typically is obtained through capital intensive air-separation units.

Catalytic membrane reactors are valuable in the production of synthesis gas. In a catalytic membrane reactor that facilitates oxidation/reduction reactions, a catalytic membrane separates an oxygen-containing gas from a reactant gas which is to be oxidized. Oxygen or other oxygen-containing species (e.g., $NO_x$ or $SO_x$) are reduced at a reduction surface of the membrane to oxygen ions ($O^{2-}$) that are then transported across the membrane to its other surface, in contact with the reactant gas. The reactant gas, for example methane, is oxidized (e.g., from $CH_4$ to CO) by the oxygen ions, and electrons ($e^-$) are evolved at the oxidation surface of the membrane. Use of these catalytic membrane reactors is believed to be beneficial for a number of reasons. First, the reaction to produce synthesis gas mediated by the catalytic membrane reactor ($CH_4 + \tfrac{1}{2}O_2 \rightarrow 2H_2 + CO$) is exothermic, as noted above. The evolved heat can be beneficially recovered in a co-generation facility, for example. Second, the synthesis gas produced using the catalytic membrane reactor can produce synthesis gas having a $H_2$:CO ratio of about 2:1. Thus, the additional and expensive processing steps necessary in conventional steam-reforming techniques are obviated, and all of the consumed natural gas can be used to produce synthesis gas.

Membrane materials useful in separating oxygen from oxygen-containing gases generally are mixed conductors, which are capable of both oxygen ion conduction and electronic conduction. The driving force of the overall oxygen transport rate through the membrane is the different oxygen partial pressure applied across the membrane. Suitable membranes are dense and gas-impermeable. Thus, direct passage of oxygen molecules and any other molecular species through the membrane is blocked. Oxygen ions, however, can migrate selectively through the membrane. The membrane thus separates oxygen from other gases.

More specifically, at elevated temperatures, generally in excess of 400° C., suitable membrane materials contain mobile oxygen ion vacancies that provide conduction sites for the selective transport of oxygen ions through the membrane. The transport through the membrane material is driven by the ratio of partial pressure of oxygen ($P_{oxygen}$) across the membrane, where oxygen ions flow from a side with high $P_{oxygen}$ to a side with low $P_{oxygen}$. Dissociation and ionization of oxygen ($O_2$ to $O^{2-}$) occurs at the membrane cathode (or reduction) surface where electrons are picked up from near surface electronic states. The flux of oxygen ions is charge-compensated by a simultaneous flux of electronic charge carriers in the opposite direction. When the oxygen ions travel through the membrane and arrive at the opposite anode (or oxidation) surface of the membrane, the individual ions release their electrons and recombine to form oxygen molecules, which are released in the reactant gas stream and the electrons return to the other side through the membrane.

The permeation or diffusion rate (also referred to herein as "flux") through a non-porous ceramic membrane is controlled by (a) the solid-state ionic transport rate within the membrane, and (b) the ion surface exchange rate on either side of the membrane. The flux of the gas to be separated usually can be increased by reducing the thickness of the membrane, until its thickness reaches a critical value. At above this critical value, the oxygen flux is controlled by both the ion surface exchange kinetics and solid state ionic transport rate. Below the critical thickness, the oxygen flux is mainly dominated by its ion surface exchange rate. Therefore, thinner membranes are desirable due to their higher solid state ionic transport rate than are thicker membranes. However, a lower ion surface exchange rate (i.e., a higher surface resistance to transport rate) of thinner membranes, can become dominant in the overall component transport rate. Surface resistance arises from various mechanisms involved in converting the molecules to be separated into ions or vice-versa at both surfaces of the membrane.

Oxygen ion conductivity in a material can result from the presence of oxygen ion defects. Defects are deviations from the ideal composition of a specific material or deviations of atoms from their ideal positions. One mechanism of oxygen ion conduction in a material is "jumping" of oxygen ions from site-to-site where oxygen vacancies exist. Oxygen vacancies in a material facilitate this "jumping" and, thus, facilitate oxygen ion conduction. Oxygen ion defects can be inherent in the structure of a given material of a given stoichiometry and crystal lattice structure, or created in a membrane material through reactions between the membrane material and the gas to which it is exposed under the operating conditions of the catalytic membrane reactor. In a given system with a given membrane material, both inherent and induced defects can occur.

Materials with inherent oxygen anion vacancies are generally preferred for use as the membrane. Loss of oxygen from a membrane material by reaction to create vacancies typically has a detrimental effect on the structural integrity of the material. As oxygen is lost, the size of the crystal lattice increases on a microscopic level. These microscopic changes can lead to macroscopic size changes. Because membrane materials are brittle, size increases lead to cracking making the membrane mechanically unstable and unusable. Furthermore, the cracking and size changes can undesirably render a once gas-impermeable material gas permeable.

Catalysts useful in the production of synthesis gas are known, and have been coated onto surfaces of membranes in the past such as, for example, in Mazanec et al. U.S. Pat. Nos. 5,714,091 and 5,723,035, and in Schwartz et al. U.S. Pat. No. 6,214,757. Generally, such catalysts include, but are not limited to, cobalt and nickel on aluminum oxide or magnesium oxide. These catalysts, however, have not necessarily been used in combination with catalytic membrane reactors for the production of synthesis gas.

The beneficial use of catalytic membrane reactors is not limited to the conversion of natural gas to synthesis gas. These reactors also can be used where oxides of nitrogen ($NO_x$) and sulfur ($SO_x$) and hydrogen sulfide ($H_2S$) are decomposed, such as disclosed in the '757 patent.

There are a number of significant challenges in constructing and maintaining catalytic membrane reactors not adequately addressed in the prior art. For example, membrane materials must be capable of conducting oxygen ions while also being chemically-and mechanically-stable at the high operating temperatures and other harsh conditions experienced during reactor operation. Further, the membrane material must remain non-reactive or inert with respect to the various catalyst material within the reactor used to catalyze the chemical reaction. Still further, the membrane material must remain non-reactive or inert with respect to the various non-oxygen-containing reactants within the reactor consumed in the chemical reaction. Additionally, provisions should be made in the reactor for electronic conduction to maintain membrane charge neutrality.

SUMMARY OF THE DISCLOSURE

An apparatus for separating oxygen from an oxygen-containing gas and facilitating a chemical reaction with the separated oxygen includes a mixed conducting membrane, a porous body, and a material for catalyzing the reaction. The mixed conducting membrane has respective oxidation and reduction surfaces and is made of a non-porous, gas-impermeable, solid material capable of simultaneously conducting oxygen ions and electrons. At least the membrane and the catalyzing material are non-reactive with each other or are physically separated from each other during oxygen separation and the chemical reaction.

In an alternative embodiment, the material for catalyzing the reaction is disposed between the reduction surface and the porous body. Furthermore, each of the membrane, the catalyzing material, and the porous body is constructed of different substances, and the catalyzing material is non-reactive with the membrane at conditions experienced during the oxygen separation and the chemical reaction.

In another alternative embodiment, the material for catalyzing the reaction is disposed between the reduction surface and the porous body, but not in physical contact with the reduction surface. This alternative embodiment optionally includes one or more spacers disposed between the reduction surface and the catalyzing material. Furthermore, the membrane, the catalyzing material, and the porous body are constructed of different substances.

In yet another alternative embodiment, the apparatus includes the mixed conducting membrane and a porous body that itself includes a material for catalyzing the reaction, wherein the porous body is disposed adjacent to the reduction surface. The membrane material and catalyzing material are different from each other and are non-reactive with respect to each other at conditions experienced during the oxygen separation and the chemical reaction. In this embodiment, the membrane material and catalyzing material are different from each other and are not in physical contact with each other.

In yet another alternative embodiment, the apparatus includes a mixed conducting membrane, a porous body, and a material for catalyzing the material. In this embodiment, the porous body is disposed between the reduction surface and the catalyzing material. Additionally, the membrane, the catalyzing material, and the porous body are constructed of different substances.

In still another embodiment of the disclosure, the apparatus includes (a) a multilayered, mixed conducting membrane that includes a non-porous layer and a porous layer, wherein the membrane is made of a non-porous, gas-impermeable, solid material or mixture of solid materials capable of simultaneously conducting oxygen ions and electrons; and, (b) a material for catalyzing the reaction, wherein the catalyzing material is disposed within pores of the porous layer. In this embodiment, the catalyzing material is non-reactive with the membrane material at conditions experienced during the oxygen separation and the chemical reaction.

Additional features of the disclosure may become apparent to those skilled in the art from a review of the following detailed description, taken in conjunction with the drawing figures and the appended claims.

BRIEF DESCRIPTION OF THE DRAWING FIGURES

For a complete understanding of the disclosure, reference should be made to the following detailed description and accompanying drawings wherein.

While the disclosed apparatus and method are susceptible of embodiment in various forms, there is illustrated in the drawing figures and will hereafter be described specific embodiments of the disclosure, with the understanding that the disclosure is intended to be illustrative, and is not intended to limit the disclosure to the specific embodiments described and illustrated herein.

DETAILED DESCRIPTION OF THE PREFERRED EMBODIMENTS

An apparatus for separating oxygen from an oxygen-containing gas and facilitating a chemical reaction with the separated oxygen includes a mixed conducting membrane, a porous body, and a material for catalyzing the reaction. The mixed conducting membrane has respective oxidation and reduction surfaces and is made of a non-porous, gas-impermeable, solid material capable of simultaneously conducting oxygen ions and electrons. At least the membrane and the catalyzing material are non-reactive with each other or are physically separated from each other during oxygen separation and the chemical reaction.

Figure 1:
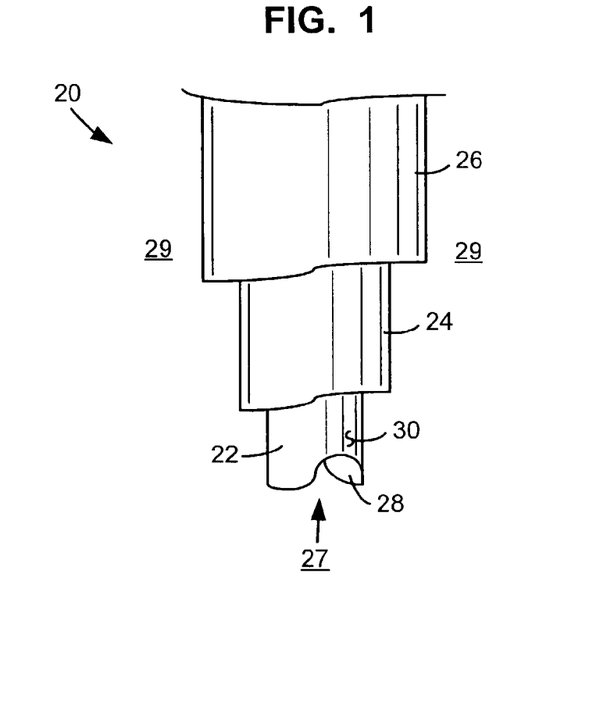
FIG. 1 illustrates a partial, fragmentary, cut-away view of an apparatus according to the disclosure.

Referring now to the drawing figures, wherein like reference numbers represent identical elements or features in the various figures, FIG. 1 illustrates a partial, fragmentary, cut-away view of an apparatus 20 for removing oxygen from an oxygen-containing gas. The apparatus 20 includes a mixed conducting membrane 22, a porous body 24, and a material 26 for catalyzing the reaction. As shown in FIG. 1, the porous body 24 is disposed between the membrane 22 and the catalyst 26. In operation, an oxygen-containing gas would occupy and pass within a first zone 27 defined by the membrane 22, and specifically a reducing (or reduction) surface 28 thereof, while a reactant gas would be present in a second zone 29 outside the membrane 22, adjacent an oxidizing (or oxidation) surface 30 thereof. Reference herein to surface 28 as the reducing or reduction surface refers to its role in reducing the oxygen in the oxygen-containing gas, whereas reference to surface 30 as the oxidizing or oxidation surface refers to its role in oxidizing the reactant gas. Thus, generally, the oxidizing side of the membrane is the side at which a process gas is oxidized by oxygen ions separated by the membrane. The reducing side of the membrane is the side at which a process gas is reduced by removal of oxygen from gas. Geometries and designs in which the oxidizing and reducing surfaces of the membrane (30 and 28, respectively) are reversed, such that the reactant gas occupies the first zone 27 and the oxygen-containing gas occupies the second zone 29 are also contemplated. As set forth in more detail herein, the disclosure is not limited to these arrangements as other arrangements are contemplated and are within the scope of this disclosure, such as those illustrated in FIGS. 2 through 10.

Figure 2:
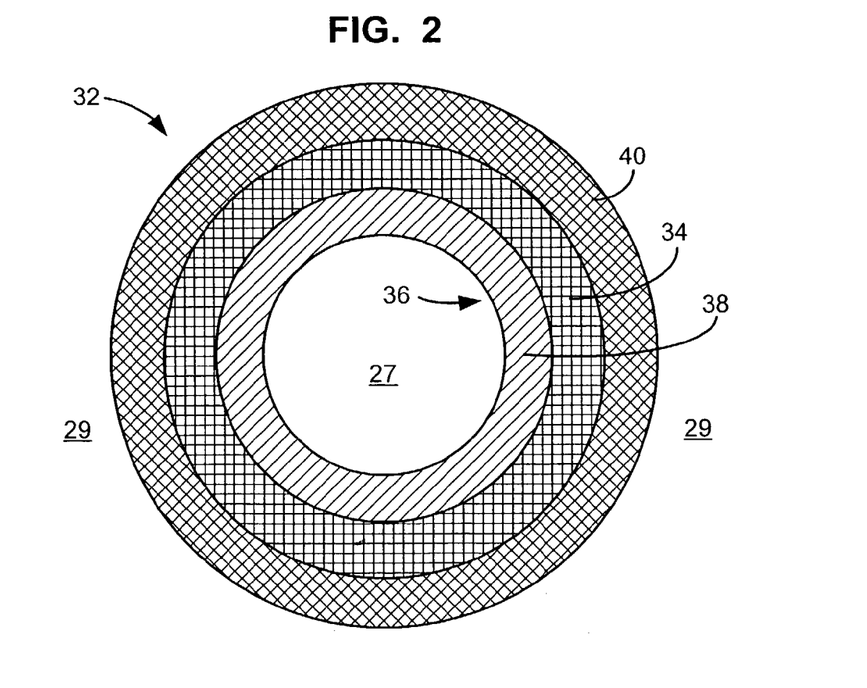
FIG. 2 illustrates a fragmentary, cross-section of a portion of an apparatus according to the disclosure.

For example, in an alternative embodiment, the material for catalyzing the reaction is disposed between the reduction surface and the porous body. FIG. 2 illustrates a fragmentary, cross-section of a portion of an apparatus 32 according to this alternative embodiment. As shown in FIG. 2, the catalyzing material 34 is disposed between the reduction surface 36 of the membrane 38 and the porous body 40. In this embodiment, each of the membrane 38, the catalyzing material 34, and the porous body 40 are constructed of different substances, and the catalyzing material 34 is non-reactive with the membrane 38 at conditions experienced during the oxygen separation and the chemical reaction.

Figure 3:
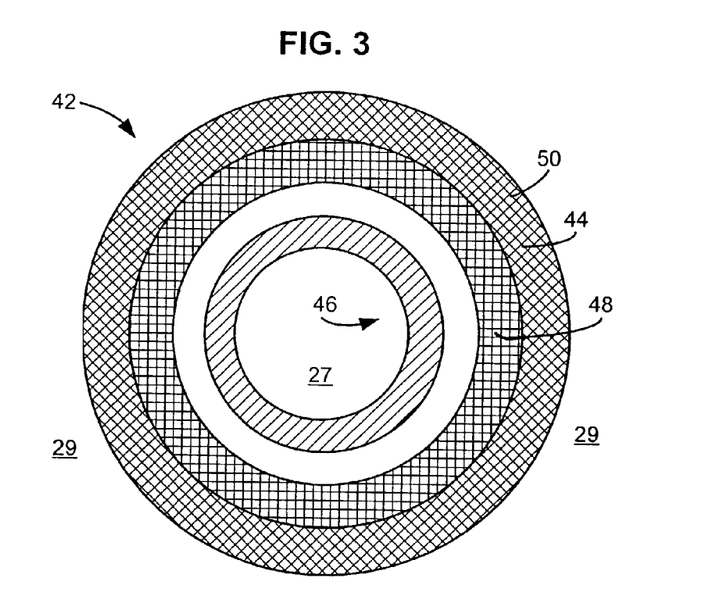
FIG. 3 illustrates a fragmentary, cross-section of a portion of an apparatus according to the disclosure.

In another alternative embodiment, the material for catalyzing the reaction is disposed between the reduction surface and the porous body, but not in physical contact with the reduction surface. FIG. 3 illustrates a fragmentary, cross-section of a portion of an apparatus 42 according to this alternative embodiment. As shown in FIG. 3, the catalyzing material 44 is disposed between the reduction surface 46 of the membrane 48 and the porous body 50. This alternative embodiment optionally includes one or more spacers (not shown) disposed between the reduction surface 46 and the catalyzing material 44. Furthermore, the membrane 48, the catalyzing material 44, and the porous body 50 are constructed of different substances. In this embodiment, the catalyzing material 44 and the membrane 48 can be reactive with respect to each other at conditions experienced during the oxygen separation and chemical reaction.

Figure 4:
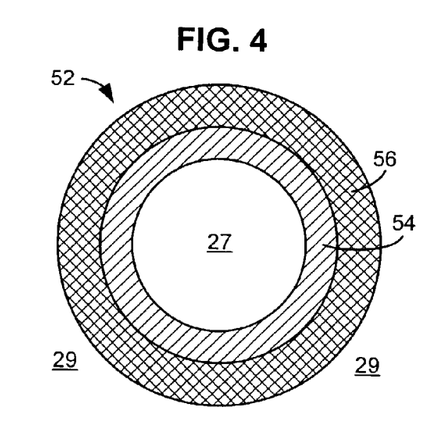
FIG. 4 illustrates a fragmentary, cross-section of a portion of an apparatus according to the disclosure.
Figure 5:
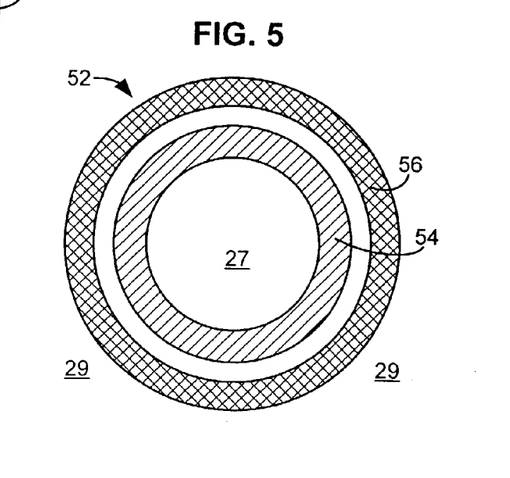
FIG. 5 illustrates a fragmentary, cross-section of a portion of an apparatus according to the disclosure.

In yet another alternative embodiment, the apparatus includes the mixed conducting membrane and a porous body that itself includes a material for catalyzing the reaction, wherein the porous body is disposed adjacent to the reduction surface. FIGS. 4 and 5 illustrate a fragmentary, cross-section of a portion of an apparatus 52 according to this alternative embodiment. As shown in FIG. 4, the apparatus 52 includes the membrane 54, and a porous body 56 that is itself constructed either partially or completely of a catalyzing material. The materials comprising the membrane 54 and the catalyzing material are different from each other and are non-reactive with respect to each other at conditions experienced during the oxygen separation and the chemical reaction. Alternatively, and as shown in FIG. 5, the material comprising the membrane 54 and the catalyzing material are different from each other and are not in physical contact with each other. Optionally, one or more spacers (not shown) may be disposed between the reduction surface of the membrane 54 and the porous body 56, wherein the spacers are non-reactive with the membrane 54 material and the porous body 56.

Figure 6:
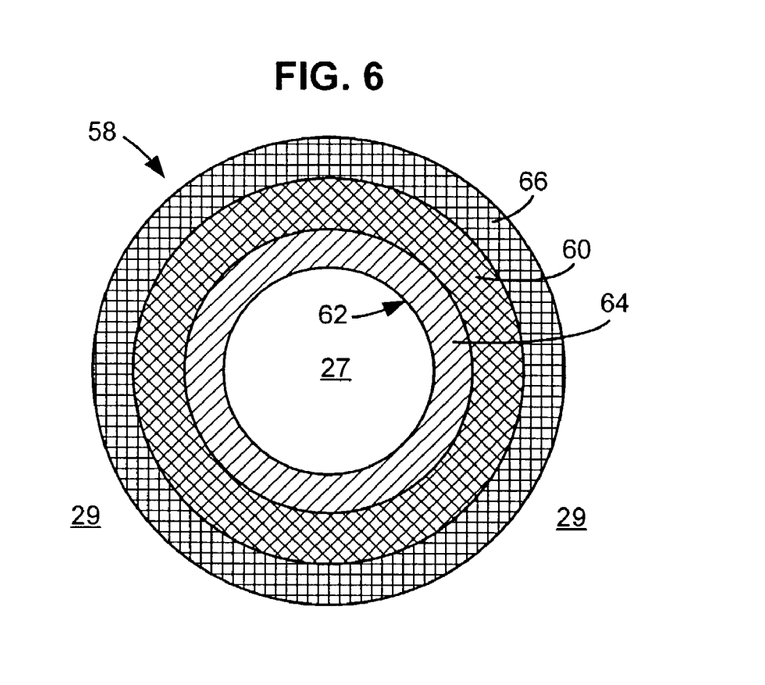
FIG. 6 illustrates a fragmentary, cross-section of a portion of an apparatus according to the disclosure.
Figure 9:
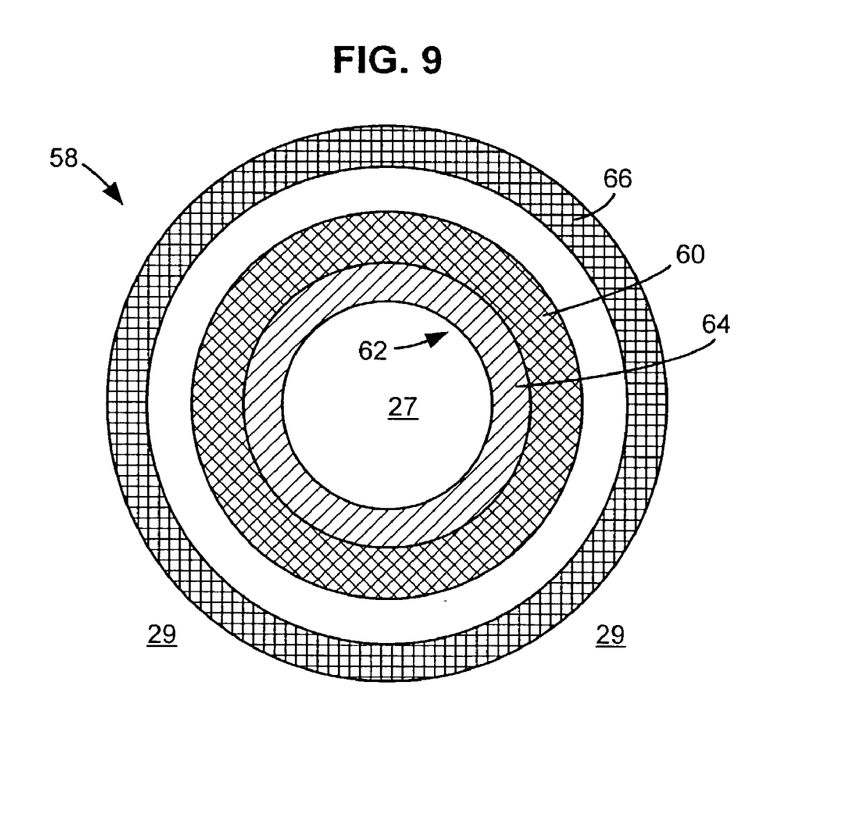
FIG. 9 illustrates a fragmentary, cross-section of a portion of an apparatus according to the disclosure; and, FIG. 10 illustrates a perspective view of a multiple-membrane catalytic reactor according to the disclosure.
Figure 10:
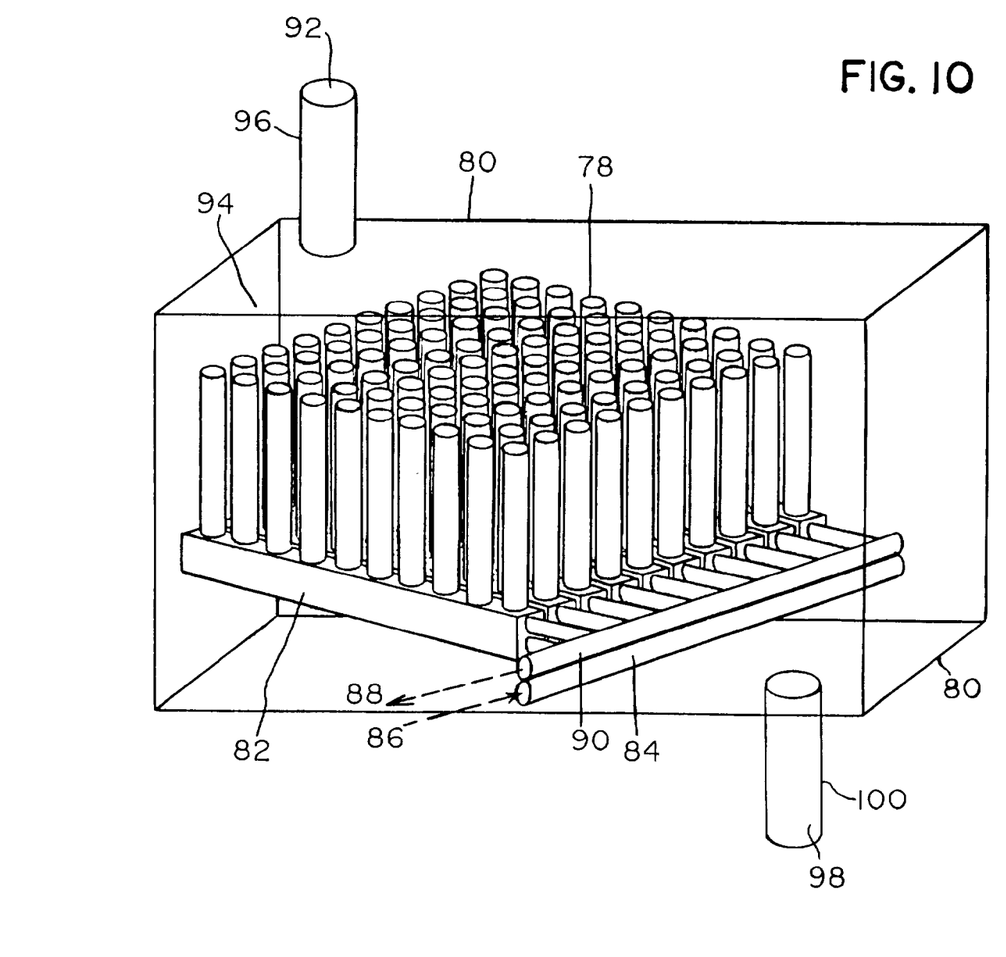

In yet another alternative embodiment, the apparatus includes a mixed conducting membrane, a porous body, and a material for catalyzing the reaction In this embodiment, the porous body is disposed between the reduction surface and the catalyzing material. FIGS. 6 and 9 illustrate a fragmentary, cross-section of a portion of an apparatus 58 according to this alternative embodiment. As shown in FIGS. 6 and 9, the porous body 60 is disposed between the reduction surface 62 of the membrane 64 and the catalyzing material 66. Additionally, the membrane 64, the catalyzing material 66, and the porous body 60 are constructed of different substances. In this embodiment, the porous body 60 optionally can be contiguous with either or both of the catalyzing material 66 and the membrane 64. Alternatively, the catalyzing material 66 and the porous body 60 are not in physical contact with each other. Optionally, one or more spacers (not shown) may be disposed between the porous body 60 and the catalyzing material 66, wherein the spacers are non-reactive with the catalyzing material 66 and the porous body 60.

Figure 7:
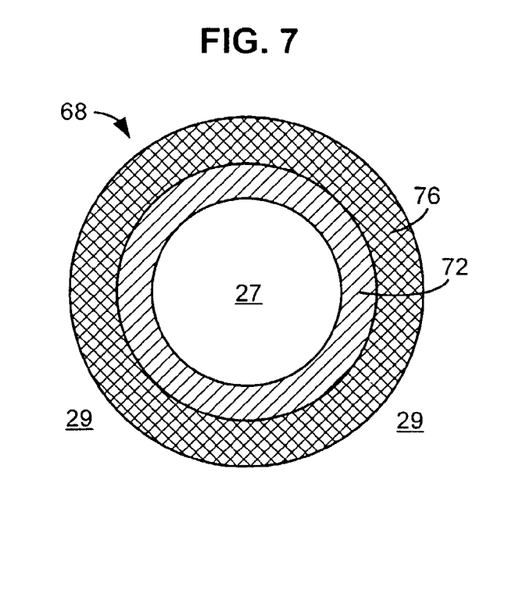
FIG. 7 illustrates a fragmentary, cross-section of a portion of an apparatus according to the disclosure.
Figure 7A:
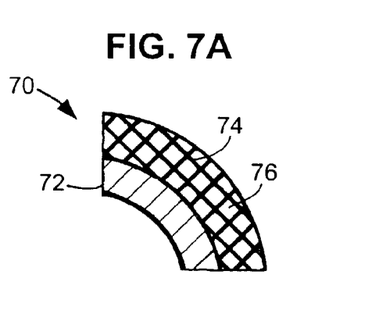
FIG. 7A illustrate a close-up view of a portion of the apparatus shown in FIG. 7.
Figure 8:
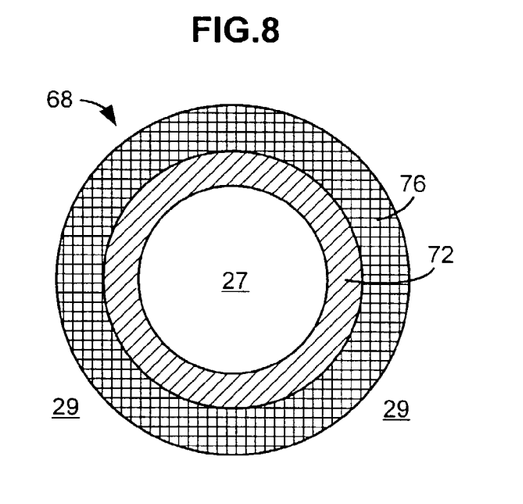
FIG. 8 illustrates a fragmentary, cross-section of a portion of an apparatus according to the disclosure.
Figure 8A:
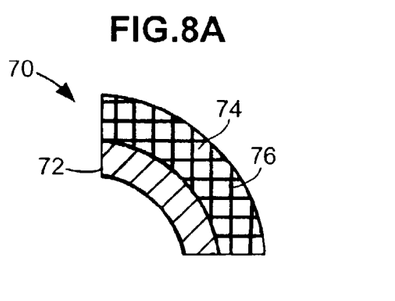
FIG. 8A illustrate a close-up view of a portion of the apparatus shown in FIG. 8.

In still another embodiment of the disclosure, the apparatus includes (a) a multilayered, mixed conducting membrane that includes a non-porous layer and a porous layer, wherein the membrane is made of a non-porous, gas-impermeable, solid material or mixture of solid materials capable of simultaneously conducting oxygen ions and electrons; and, (b) a material for catalyzing the reaction, wherein the catalyzing material is disposed within pores of the porous layer. FIGS. 7 and 8 illustrate a fragmentary, cross-section of a portion of an apparatus 68 according to this alternative embodiment. FIGS. 7A and 8A illustrate close-up views of portions of the apparatus shown in FIGS. 7 and 8A, respectively. As shown in FIGS. 7, 7A, 8, and 8A, the apparatus 68 includes a multilayered, membrane 70 that includes a non-porous layer 72 and a porous layer 74. The catalyzing material 76 is disposed within pores of the porous layer 74. In these embodiments, the catalyzing material 76 is non-reactive with the membrane 70 material at conditions experienced during the oxygen separation and the chemical reaction.

Shown in FIGS. 1 through 10 are various embodiments of portions of an apparatus according to the disclosure. The embodiments shown are tubular in nature, but need not be and can be of any suitable geometric shape or shapes. Examples of suitable geometric designs include a shell-and-tube design (such as the one described herein), a fixed-tube-sheet design, a plate-type design (e.g., plate-and-frame or planar arrangements like those disclosed in EP 732,138 B1), a bayonet-tube design, a spiral tube design, and other designs commonly found in the heat-transfer equipment arts.

In practice, a reactor will include an arrangement of a plurality of one or more of the aforementioned embodiments. For example, referring to FIG. 10, there is depicted a reactor 80 utilizing apparatus (in the form of closed tubes 78) of the types described above and depicted in FIGS. 1 through 9. The tubes 78, which comprise closed-end membrane tubes, like those depicted in FIGS. 1 through 9, are enclosed in a reactor module 80, and are linked together by a manifold 82. An inlet feed tube 84 delivers an oxygen-containing gas 86 to the closed tubes 78, and oxygen-depleted gas 88 exits the tubes 78 via the manifold 82 through exit tube 90. A reactant gas 92 is delivered to the reduction zone 94 via a reactor shell inlet port 96. Reacted gas 98 exits the reduction zone 94 via an outlet port 100.

The term "mixed conducting membrane" as used herein defines a solid material or mixture of solid materials which simultaneously conducts both oxygen ions and electronic species (e.g., electrons). Additionally, the membrane promotes the coupled reduction of an oxygen-containing gas and oxidation of a reactant gas. The membrane can include any suitable solid material which perform these simultaneous functions. Such materials generally are described, for example, in Mazanec et al. U.S. Pat. Nos. 5,306,411 and 5,702,959, Carolan et al. U.S. Pat. No. 5,712,220, Prasad et al. U.S. Pat. No. 5,733,435, and in Mazanec, *Electrochem. Soc. Proceedings* 95:16–28 (1997), all of which are incorporated herein by reference.

Alternatively, the mixed conducting membrane can be a mixture of one or more ion-conducting, solid materials and one or more solid materials which conduct electronic species (e.g., electrons) wherein the mixture of solid materials forms a composite, mixed conducting membrane. One example of a composite, mixed conducting membrane uses zirconia as the oxygen ion-conducting, solid material and palladium as the conductor of electronic species. Another example of a composite, mixed conducting membrane uses zirconia as the oxygen ion-conducting, solid material and a mixture of indium and praseodymium oxides as the conductor of electronic species. Since the reactive environment on the reduction side of the membrane typically creates very low partial oxygen pressures, chromium-containing perovskites are especially suitable materials since such materials tend to be stable in the low partial oxygen pressure environment. In contrast, the chromium-containing perovskites typically do not decompose at very low partial oxygen pressures.

Preferably, the membrane is a perovskite having the general formula:

$$ABO_3,$$

In the formula, element A is selected from the group consisting of Group II metals, calcium, strontium, barium, yttrium, lanthanum, lanthanide series metals, actinide series metals, and mixtures thereof. Element B is selected from the group consisting of iron, manganese, chromium, vanadium, titanium, copper, nickel, cobalt, and mixtures thereof.

Membranes according to the disclosure are shaped to have two surfaces: a reduction surface and an oxidation surface. These membranes can be fabricated in a variety of shapes appropriate for a particular reactor design, including disks, tubes, closed-end tubes, or as reactor cores for cross-flow reactors. The membrane is fabricated sufficiently thick to render it substantially gas-impermeable and mechanically stable to withstand the stresses associated with reactor operation, yet not so thick as to substantially limit the oxygen permeation rate through the membrane. The membrane preferably has a thickness (T) defined by the distance between the reduction and oxidation surfaces of about 0.001 millimeters (mm) to about 10 mm, more preferably about 0.05 mm to about 0.5 mm.

The membrane preferably is capable of transporting oxygen ions and electrons at the prevailing oxygen partial pressure in a temperature range of about 350° C. to about 1200° C. when a chemical potential difference is maintained across the membrane surface. The chemical potential difference can be caused by maintaining a positive ratio of oxygen partial pressures across the membrane. This positive ratio preferably is achieved by reacting transported oxygen with an oxygen-consuming (or reactant) gas. The oxygen ion conductivity typically is in a range of about 0.01 to about 100 S/CM, where S ("Siemens") is reciprocal ohms (1/Ω). In addition to the increased oxygen flux, the membrane preferably exhibits stability over a broad temperature range of about 0° C. to 1400° C. (and more preferably about 25° C. to 1050° C.), and an oxygen partial pressure range of about $1 \times 10^{-6}$ to about 10 atmospheres (absolute) without undergoing phase transitions.

In a catalytic reactor useful for oxidation/reduction reactions, the membrane forms a barrier between an oxygen-containing gas and a reactant gas with the reduction surface of the membrane in contact with the oxygen-containing gas in the first zone 27, for example, and the oxidizing surface of the membrane in contact with the reactant gas in the second zone 29, for example. The oxygen-containing gas is reduced at the reduction surface of the membrane generating oxygen anions ($O^{2-}$) at that surface, which are conducted through the membrane to the oxidizing surface of the membrane. Oxygen anions ($O^{2-}$) at the oxidizing surface oxidize the reactant gas, generating electrons ($e^-$) at that surface, which are conducted back through the membrane to maintain electrical neutrality in the membrane and facilitate additional reduction and oxygen anion conduction.

In a catalytic reactor for oxygen separation, the membrane forms a barrier between an oxygen-containing gas, in contact with the reduction surface of the membrane, and an oxygen-depleted gas or partial vacuum in contact with the oxidation surface of the membrane. Oxygen is reduced at the reduction surface to form oxygen anions, which are transported across the membrane, oxidized at the oxidizing surface of the membrane and released into the oxygen-depleted gas or partial vacuum. The oxygen-depleted gas does not substantially react with oxygen anions.

Examples of catalytic membrane reactions facilitated by use of the membrane and reactors of this disclosure include partial oxidation of methane, natural gas, light hydrocarbons, other gaseous hydrocarbons, and mixtures of methane or other hydrocarbons with or without carbon dioxide ($CO_2$) to synthesis gas, full or partial reductive decomposition of oxides of nitrogen ($NO_x$), oxides of sulfur ($SO_x$), $CO_2$, and hydrogen sulfide ($H_2S$), and the separation of molecular oxygen ($O_2$) from mixtures of other gases, particularly its separation from air. Catalytic membranes used in accordance with the disclosure can facilitate the reduction of $NO_x$ to molecular nitrogen ($N_2$), $SO_x$ to sulfur (S), $CO_2$ to carbon monoxide (CO), and $H_2S$ to S and $H_2O$. These types of membranes also can be used to facilitate dehydrogenation and oxydehydrogenation reactions of the type disclosed in Mazanec et al. U.S. Pat. No. 5,306,411, the disclosure of which is incorporated herein by reference.

According to the disclosure, selection of the catalyzing material depends upon the reaction desired in the second zone 29 of the reactor. Typically, however the catalyzing material comprises one or more active metals selected from the group consisting of iron, ruthenium, cobalt, rhodium, nickel, palladium, platinum, copper, silver, gold, and mixtures thereof.

The catalyzing material should have a surface area ($A_C$), and a ratio of active metal to surface area of at least about 0.001 grams per square meter (g/m$^2$), preferably at least 0.05 g/m$^2$, and more preferably at least 0.25 g/m$^2$. Alternatively, where the membrane reduction surface has a surface area defined as $A_R$, the catalyzing material should have a surface area ($A_C$) defined by the formula:

$$A_C = y(A_R),$$

where y is 0.01 to 1000, preferably 1 to 100. Considered in another way, the catalyst surface area ($A_C$) should be at least about 0.1 square meters/gram (m$^2$/g), preferably at least about 0.5 m$^2$/g, more preferably at least about 1.0 m$^2$/g, and even more preferably at least about 10 m$^2$/g.

Suitable catalyzing material for use in the production of synthesis gas includes one or more active metals selected from the group consisting of iron, ruthenium, cobalt, rhodium, nickel, palladium, platinum, copper, silver, gold, and mixtures thereof. Preferably, the catalyzing material is about 1 wt. % to about 20 wt. % nickel, based on the total weight of catalyzing material. More preferably, the catalyzing material is about 7 wt. % to about 15 wt. % nickel, based on the total weight of catalyzing material.

Examples of suitable catalyzing materials for use in the full or partial reductive decomposition of $NO_x$ to nitrogen and oxygen, $SO_x$ to sulfur and oxygen, and hydrogen sulfide to hydrogen and sulfur, and for the dehydrogenation and oxydehydrogenation reactions are disclosed in, for example, Mazanec et al. U.S. Pat. No. 5,306,411, the disclosure of which is incorporated herein by reference.

The catalyzing material can be fabricated to form any suitable shape and structure corresponding to that of the membrane, porous body, and reactor vessel. Specifically, the catalyzing material can be fabricated in the shape(s) of disks, tubes, or closed-end tubes. The catalyzing material should be disposed at a distance (D) away from the reduction surface defined by $$D = x(T),$$

where x is 0 to 20. In some embodiments of the disclosure, the catalyzing material and porous body are contiguous, and/or the catalyzing material and the membrane are contiguous.

Thinner membranes increase the overall flux or diffusion rate for a given membrane material. To exploit this phenomena, thinner membranes may be supported by one or more porous bodies.

The support or porous body may be fabricated from an inert material which does not conduct oxygen ions and/or electronic species at process operating conditions. Alternatively the support can be an ionically conducting material, an electron-conducting material or a mixed conducting oxide material of the same or different composition than an active layer of mixed conducting membrane material. Preferably, the porous support is fabricated from a material having thermal expansion properties that are compatible with the mixed conducting membrane material, and the compositions making up the respective layers should be selected from materials that do not adversely chemically react with one another under process operating conditions. Preferably, the porous body includes one or more substances selected from the group consisting of alumina ($Al_2O_3$), silica ($SiO_2$), ceria ($CeO_2$), zirconia ($ZrO_2$), titania ($TiO_2$), magnesium oxide (MgO), and mixtures thereof, wherein the substance is optionally doped with one or more alkaline earth metals, lanthanum, lanthanide series metals, and mixtures thereof.

In accordance with the preferred embodiments of the disclosure, the porous body should contain a plurality of pores having a mean diameter of at least about five microns. The porous body should have a porosity of about 25% to about 98%, preferably, about 50% to about 95%, and more preferably about 70% to about 92%.

Unless specified otherwise, the term "oxygen" is used herein to describe generically any form of oxygen (O, atomic number 8) present in the gas streams and reactor systems described. The generic term oxygen includes molecular oxygen ($O_2$), oxygen ions (for example $O^-$ or $O^{2-}$), atomic oxygen (O—), or other forms of oxygen derived from molecular oxygen. In the gas streams and systems described. The term "oxygen" as used herein does not include oxygen which is chemically bound in oxides of carbon, nitrogen, and sulfur, or other oxygen-containing compounds.

The term "oxygen-containing gas" is used broadly herein to include gases and mixtures of gases in which at least one of the component gases is oxygen or an oxide. The oxygen or oxide component of the gas is capable of being reduced at the reduction surface of the membrane of this disclosure. The term includes oxides of carbon ($CO_x$), nitrogen ($NO_x$ and $N_xO$), and sulfur ($SO_x$) among others, and gas mixtures in which an oxide is a component such as, for example, $NO_x$ in an inert gas or in another gas not reactive with the membrane. The term also includes mixtures of oxygen in other gases such as, for example, $O_2$ in air and O in $H_2O$. In the apparatus of the disclosure, the oxygen-containing gas is passed in contact with the reduction surface of the membrane and the oxygen-containing component of the gas is at least partially reduced at the reduction surface such as, for example, $NO_x$ to $N_2$. The gas passing out of the reduction zone of the reactor may contain residual oxygen or oxygen-containing component. "Oxygen selectivity" is intended to convey that the oxygen ions are preferentially transported across the membrane over other elements, and ions thereof.

The term "reactant gas" is used broadly herein to refer to gases or mixtures of gases containing at least one component that is capable of being oxidized at the oxidation surface of the reactor or membrane therein. Reactant gas components include, but are not limited to methane, natural gas (whose major component is methane), and gaseous hydrocarbons including light hydrocarbons (as this term is defined in the chemical arts). Those skilled in the art recognize that while methane is a major compound of natural gas, other lesser components include $C_{3-6}$ hydrocarbons as well as trace amounts of $C_7$ or higher hydrocarbons. Reactant gases include mixtures of reactant gas components, mixtures of such components with inert gases, or mixtures of such components with oxygen-containing species, such as CO, $CO_2$, or $H_2O$. The term "oxygen-consuming gas" also may be used herein to describe a reactant gas that reacts with oxygen anions generated at the oxidation surface of the reactor or membrane therein.

The term "oxygen-depleted gas," dependent upon the context, may refer (1) to a gas or gas mixture from which oxygen has been separated by passage through a reactor of this disclosure (i.e., the residual of the oxygen-containing gas) or (2) to a gas or gas mixture that is introduced into the oxidation zone of a reactor used for oxygen separation to carry the separated oxygen. In the second context, the oxygen-depleted gas may be an inert gas, air or other non-reactive gas that substantially does not contain components that will be oxidized in the oxidation zone of the reactor. When used in the second context, the term can be applied to mixtures containing some oxygen, such as air, the oxygen content of which will be increased by passage through the oxidation zone of the reactor.

The terms "oxygen-containing gas," "reactant gas," "oxygen-consuming gas," and "oxygen-depleted gas," and any other gas mixture discussed herein includes materials which are not gases at temperatures below the temperature ranges of the pertinent process of the present disclosure, and may include materials which are liquid or solid at room temperature. An example of an oxygen-containing gas which is liquid at room temperature is steam.

The term "gas-impermeable" as applied to membrane materials of this disclosure means that the membrane is substantially impervious to the passage of oxygen-containing or reactant gases in the reactor. Minor amounts of transport of gases across the membrane may occur without detriment to the efficiency of the reactor. The meaning of the term "gas impermeable" is tied to the relative density of a material. For example, a material having a theoretical density greater than 87% is generally considered to be impermeable to gases, assuming that the porosity of the material is randomly distributed and there are no cracks in the material.

The phrase "different substances" means that that two substances chemically differ from one another. Thus, for example, materials made of different elemental compositions are constructed of "different substances," whereas materials made of the same elemental compositions but having different porosity are not constructed of "different substances." The phrase "different substances" is not meant to exclude situations where the catalyst and the support share common elements (e.g., $LaSrFeAlO_x$) on $Al_2O_3$).

The term "non-reactive" means any initial reaction between two substances ceases as the interface between the substances is built up and stabilized. Thus, substances are "non-reactive" with respect to one another when a stable interface is established in a short period of time like, for example, about 24 hours to about 48 hours.

EXAMPLE

The following example is provided to illustrate the disclosure but is not intended to limit the scope of the disclosure.

A dense, mixed conducting ceramic tube having a closed end and an open end was placed in a reactor system capable of feeding fuelgas on the outside of the tube and air on the inside of the tube. The tube was constructed of LaSrFeCrOx material, and had a length of 12.8 centimeters (cm), an outer diameter of 1.02 cm, and an inner diameter of 0.82 cm. The tube was wrapped in a single layer of 2 cm wide strip of foamed, porous nickel, commercially available as Incofoam™ from Inco Special Products, Toronto, Canada. The strip was wrapped around the tube in a helical fashion with some overlap between the turns to assure that the entire outer tube surface was covered. The entire reactor system was placed in a furnace and heated to about 940° C. The seal between the reactor metal and the ceramic tube was tested to assure that there was no leakage from the high-pressure fuel side to the low-pressure air side.

Air was fed at atmospheric pressure to the inside of the tube at a rate of about 6 to 8 standard liters per minute (SLPM). Fuel was introduced on the outside of the tube at a pressure of about 185 to about 210 pounds per square inch gauge (psig) and at a rate of about 1.7 to about 2.5 SLPM. The fuel composition was 10% hydrogen ($H_2$), 10% carbon monoxide (CO), 40% methane ($CH_4$), and 40% carbon dioxide ($CO_2$). The steam to carbon ratio varied from about 0.95 to about 1.26. During the run, the furnace set point was used to control the reaction and was varied from about 915° C. to about 942° C. The tube/reactor seal was tested by checking for the presence of $CO_2$ in the air stream.

The catalyst temperature was measured at the midpoint of the tube with a thermocouple that was located between the foamed, porous nickel catalyst and the tube. The catalyst temperature varied during the course of the run from about 750° C. to about 890° C. The fuel-side and air-side effluents were analyzed by gas chromatography. The oxygen flux was calculated to be about 13 standard cubic centimeters (of oxygen) per square centimeter of membrane surface (sccm/$cm^2$) to about 16 sccm/$cm^2$, based on the air-side oxygen loss and the inner diameter surface area of the tube. Methane conversion was greater than 95%. The product distribution matched the calculated equilibrium values for the given temperature, pressure, and reactant ratios.

Yield data at various stages in the run are shown in the table below. The values set forth in the table represent raw data and, thus, are not corrected for mass balances. The flow rates are in sccm units.

TABLE

Yield Data

| Run Time (Hours) | Airside Temp (° C.) | Pressure (psig) | Flows In (sccm) | | | | | Flows Out (sccm) | | | | | Methane Conversion (%) |
|---|---|---|---|---|---|---|---|---|---|---|---|---|---|
| | | | $H_2$ | $CH_4$ | CO | $CO_2$ | $H_2O$ | $H_2$ | $CH_4$ | CO | $CO_2$ | $H_2O$ | |
| 0.7 | 974 | 188 | 195 | 789 | 155 | 800 | 1728 | 1316 | 63 | 970 | 810 | 1674 | 92 |
| 40 | 974 | 208 | 196 | 800 | 202 | 800 | 1728 | 1428 | 26 | 1026 | 823 | 1674 | 97 |
| 60 | 986 | 209 | 216 | 881 | 223 | 880 | 1965 | 1512 | 35 | 1086 | 900 | 1674 | 96 |
| 90 | 990 | 183 | 216 | 880 | 223 | 880 | 2462 | 1565 | 56 | 1040 | 973 | 2058 | 94 |
| 130 | 986 | 185 | 216 | 881 | 223 | 880 | 2462 | 1585 | 80 | 982 | 987 | 2272 | 91 |

The foregoing description is given for clearness of understanding only, and no unnecessary limitations should be understood therefrom, as modifications within the scope of the disclosure may be apparent to those having ordinary skill in the art.

What is claimed is:

1. An apparatus for separating oxygen from an oxygen-containing gas and facilitating a chemical reaction with the separated oxygen, the apparatus comprising:
    (a) a mixed conducting membrane having opposed oxidation and reduction surfaces, the membrane comprising a non-porous, gas-impermeable, solid material or mixture of solid materials capable of simultaneously conducting oxygen ions and electrons;
    (b) a porous body comprising one or more substances selected from the group consisting of alumina, ($AL_2O_3$), silica ($SiO_2$), ceria ($CeO_2$), zirconia ($ZrO_2$) titania ($TIO_2$), magnesium oxide (MgO), and mixtures thereof, and optionally one or more dopants selected from the group consisting of alkaline earth metals, lanthanum, and lanthanide series metals; and,
    (c) a material for catalyzing the reaction, the material disposed between the reduction surface and the porous body,
wherein the membrane, the catalyzing material, and the porous body are constructed of different substances, and wherein the catalyzing material is non-reactive with the membrane at conditions experienced during the oxygen separation and the chemical reaction.

2. The apparatus of claim 1, wherein the solid material or mixture of solid materials is a perovskite having the general formula:

$ABO_3$ wherein
    A is selected from a group consisting of a Group II metal, calcium, strontium, barium, yttrium, lanthanum, a lanthanide series metal, an actinide series metal, and a mixture thereof; and,
    B is selected from a group consisting of iron, manganese, chromium, vanadium, titanium, copper, nickel, cobalt, and a mixture thereof.

3. The apparatus of claim 1, wherein the membrane has a thickness (T) defined by the distance between the reduction and oxidation surfaces of about 0.001 millimeters (mm) to about 10 mm.

4. The apparatus of claim 3, wherein the catalyzing material is disposed at a distance (D) away from the reduction surface defined by D=x (T), where x is 0 to 20.

5. The apparatus of claim 1, wherein the catalyzing material and porous body are contiguous.

6. The apparatus of claim 1, wherein the catalyzing material and the membrane are contiguous.

7. The apparatus of claim 1, wherein the catalyzing material comprises one or more active metals selected from the group consisting of iron, ruthenium, cobalt, rhodium, nickel, palladium, platinum, copper, silver, gold, and mixtures thereof.

8. The apparatus of claim 7, wherein the catalyzing material comprises nickel.

9. The apparatus of claim 8, wherein the catalyzing material comprises about 1 wt. % to about 20 wt. % nickel, based on the total weight of catalyzing material.

10. The apparatus of claim 7, wherein the catalyzing material has a surface area ($A_C$), and the ratio of active metal to the surface area is at least about 0.001 grams per square meter (g/m$^2$).

11. The apparatus of claim 10, wherein the ratio of active metal to the surface area is at least about 0.05 g/m$^2$.

12. The apparatus of claim 1, wherein the reduction surface has a surface area ($A_R$), and wherein the catalyzing material has a surface area ($A_C$) defined by $A_C=y(A_R)$, where y is 0.01 to 1000.

13. The apparatus of claim 1, wherein the porous body has a plurality of pores having a mean diameter of at least about five microns.

14. The apparatus of claim 1, wherein the porous body has a porosity of about 25% to about 98%.

15. The apparatus of claim 14, wherein the porous body has a porosity of about 50% to about 95%.

16. The apparatus of claim 15, wherein the porosity of the porous body is about 70% to about 92%.

17. The apparatus of claim 1, wherein the catalyzing material has a surface area ($A_C$) of at least 0.1 square meters/gram (m$^2$/g).

18. The apparatus of claim 17, wherein the surface area ($A_C$) is at least 1.0 m$^2$/g.

19. The apparatus of claim 18, wherein the surface area ($A_C$) is at least 10 m$^2$/g.

20. An apparatus for separating oxygen from an oxygen-containing gas and facilitating a chemical reaction with the separated oxygen, the apparatus comprising:
    (a) a mixed conducting membrane having opposed oxidation and reduction surfaces, the membrane comprising a non-porous, gas-impermeable, solid material or mixture of solid materials capable of simultaneously conducting oxygen ions and electrons;
    (b) a porous body comprising one or more substances selected from the group consisting of alumina, ($AL_2O_3$), silica ($SiO_2$), ceria ($CeO_2$), zirconia ($ZrO_2$), titania ($TiO_2$), magnesium oxide MgO), and mixtures thereof, and optionally one or more dopants selected from the group consisting of alkaline earth metals, lanthanum, and lanthanide series metals;

c) a material for catalyzing the reaction which is non-reactive with the membrane at conditions experienced during the oxygen separation and the chemical reaction, the material disposed between the reduction surface and the porous body, but not in physical contact with the reduction surface; and, (d) optionally, one or more spacers disposed between the reduction surface and the catalyzing material, wherein the membrane, the catalyzing material, and the porous body are constructed of different substances.

21. The apparatus of claim 20, wherein the catalyzing material and the membrane are reactive with respect to each other at conditions experienced during the oxygen separation and chemical reaction.

22. The apparatus of claim 21, wherein the catalyzing material and porous body are contiguous.

* * * * *